Sept. 26, 1967
J. H. FADER
3,343,833
HYDRAULIC SHOCK ABSORBER
Filed Oct. 20, 1965
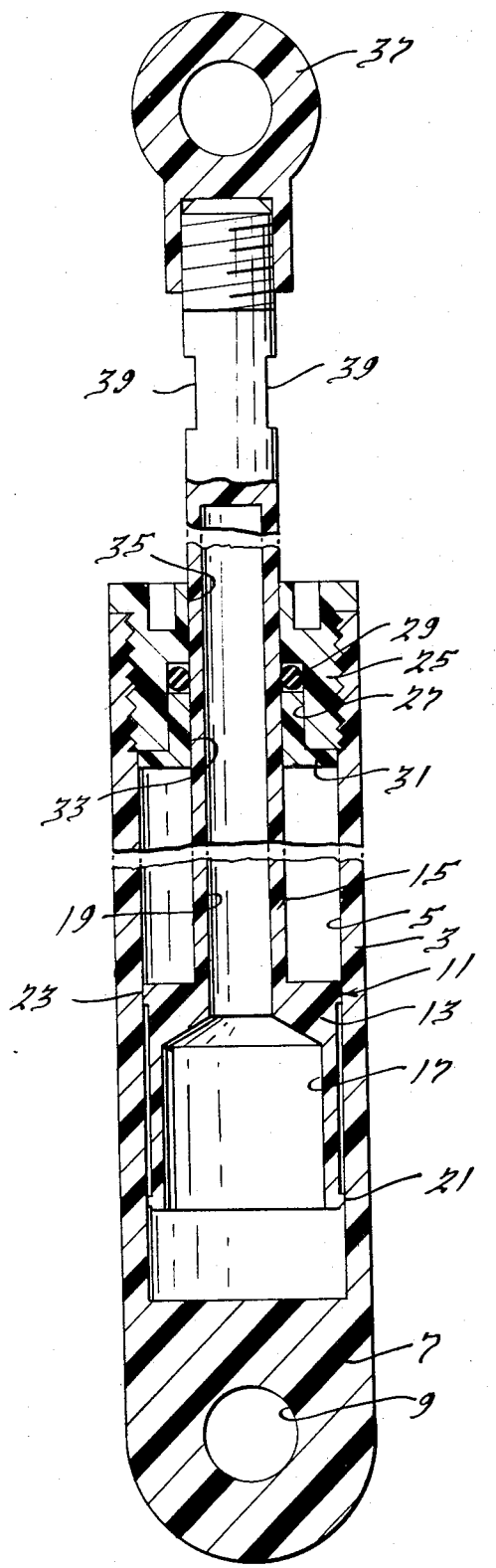
INVENTOR.
John H. Fader
BY
Harness, Dickey & Pierce
ATTORNEYS.

United States Patent Office 3,343,833
Patented Sept. 26, 1967

3,343,833
HYDRAULIC SHOCK ABSORBER
John H. Fader, St. Truiden, Belgium, assignor to Monroe Belgium N.V., St. Truiden, Belgium
Filed Oct. 20, 1965, Ser. No. 498,277
5 Claims. (Cl. 267—64)

This invention relates generally to direct acting hydraulic shock absorbers and more particularly to an improved and inexpensive plastic shock absorber of the single tube or cylinder type.

The primary object of this invention is to provide a shock absorber wherein the major components are made of plastic material and which shock absorber is of a relatively simple and inexpensive construction.

Other objects and advantages of the device of this invention will become apparent from the following detailed description of the invention taken in conjunction with the accompanying drawing which is a longitudinal sectional view of one embodiment of the shock absorber of this invention.

Referring now to the drawing it will be seen that the shock absorber includes a cylinder or tube 3 having an internal bore 5 with the lower end of the bore being closed by an integral end portion 7 of the cylinder 3. While the cylinder may be formed of any suitable material it is preferably formed from a plastic material such as polypropylene. The end portion 7 of the cylinder has an aperture 9 extending therethrough adapted to receive suitable means for connecting that end of the cylinder to one portion of an assembly which is movable relative to another portion.

An integral piston and piston rod member 11 is disposed within the cylinder 3 so as to be movable axially therein. The member 11 includes a piston portion 13 and a piston rod portion 15. The piston is provided with a relatively large recess 17 therein as shown in the drawing which communicates at its upper end with a bore or passage 19 in the piston rod, which bore or passage terminates adjacent the upper end of the piston rod. While the member 11 may be made of any suitable material it likewise is preferably made of a plastic such as polypropylene and the piston portion is shown as having upper and lower peripheral surfaces 21 and 23 which are just slightly smaller in diameter than the internal diameter of the cylinder 3 to provide an orifice between the cylinder and piston through which hydraulic fluid can pass between the upper and the lower cylinder bore portions. This orifice is such as to dampen movement of the piston in the cylinder and is responsive to changes in piston velocity to provide orifice control for the shock absorber. If additional control is desired additional orifice or compression and rebound valve arrangements may be incorporated in the piston or piston rod.

The upper end of the cylinder 3 is closed by means of a rod guide 25, likewise preferably made of polypropylene plastic. The rod guide 25 has a recess 27 in the under side thereof in which is disposed a rubber O-ring 29 held in place by a plunger or guide member 31. The guide member 31 has a center aperture 33 therethrough which is in alignment with a similar aperture 35 in the rod guide 25 above the O-ring so that the piston rod 15 extends therethrough and is sealed by the O-ring. A loop type attaching member 37 is connected to the upper end of the piston rod 15 for connecting the member 11 to the other relatively movable portion of an assembly so that the ends 37 and 7 of the shock absorber move toward and away from each other in operation. The piston rod 15 is provided with flat surface 39 adjacent the upper end thereof to permit a tool to be applied thereto so that the rod may be easily rotated.

The shock absorber cylinder is filled with hydraulic fluid such as oil, water, etc., and the hollow piston rod and piston contains air at atmospheric pressure although if desired the pressure of the air could be increased. When the shock absorber moves on the compression stroke, i.e., when the piston 13 moves toward the cylinder closed end 7, hydraulic fluid in the lower part of the cylinder flows upwardly between the piston periphery and cylinder bore wall so as to provide resistance to such movement which is predetermined in accordance with the nature of the assembly on which the shock absorber is mounted. Because the piston rod 15 occupies a portion of the volume of the cylinder above the piston 13 the upper portion of the cylinder cannot accommodate all of the fluid in the lower portion of the cylinder and such fluid flows up into the piston recess 17 and the hollow bore 19 of the piston rod. The volume of recess 17 and bore 19 is such to accommodate all of the displaced hydraulic fluid and the air in the piston rod is compressed between hydraulic fluid thus providing to some extent a compression spring effect.

Upon movement of the piston 13 away from the lower end 7 of the cylinder the hydraulic fluid flows from the upper portion of the cylinder through the orifice between the piston and cylinder into the lower portion of the cylinder and oil in the piston rod flows out into the lower portion of the cylinder as the piston moves upwardly. The movement of the hydraulic fluid past the piston provides a dampening effect which can be controlled by the relative spacing between the piston and cylinder. Because these parts are made of a like plastic material they have identical co-efficients of expansion and tolerances between the outer perimeter of the piston and the bore can be accurately controlled to provide differing dampening effects.

The foregoing structure, because it can be made of multiplastic parts and because it contains a very limited number of parts is relatively inexpensive to manufacture while constituting a satisfactory shock absorbing device. Also the shock absorber can be operated in any position and upside down from the position shown in the drawing.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. A hydraulic direct acting shock absorber including a plastic cylinder having one end thereof closed, a plastic piston disposed in said cylinder, means providing an orifice communicating said cylinder on one side of said piston with said cylinder on the other side of said piston through which hydraulic fluid can restrictively pass, a hollow piston rod connected with said piston and extending beyond the opposite end of said cylinder, guide and sealing means closing the opposite end of said cylinder and slidably receiving said piston rod, said hollow piston rod communicating through said piston with said cylinder on the opposite side of said piston from said piston rod, said cylinder being substantially filled with hydraulic fluid and said hollow piston rod being filled with gas whereby when said piston moves toward said one cylinder end the hydraulic fluid displaced by said piston rod will flow through said orifice means and into said hollow piston rod thereby compressing the gas therein and when said piston moves toward said opposite cylinder end the hydraulic fluid will flow out of said piston rod and into said cylinder so as to keep the latter filled with hydraulic fluid at all times.

2. The structure of claim 1 wherein the orifice means is formed by having the outer periphery of the piston slightly smaller than the bore of said piston under all operating conditions to provide a velocity responsive control orifice through which the hydraulic fluid passes.

3. The structure of claim 1 wherein the piston rod and piston are formed as an integral part.

4. The structure of claim 1 wherein said piston has a recess therein communicating with said cylinder and said hollow piston rod.

5. The structure of claim 1 wherein the piston and cylinder are molded from the same plastic material so as to have the same co-efficient of expansion.

No references cited.

ARTHUR L. LA POINT, *Primary Examiner.*

R. M. WOHLFARTH, *Assistant Examiner.*